US010932445B2

(12) United States Patent
Skvorc, II

(10) Patent No.: US 10,932,445 B2
(45) Date of Patent: *Mar. 2, 2021

(54) SYSTEM FOR UNIQUELY IDENTIFYING SUBJECTS FROM A TARGET POPULATION

(71) Applicant: BIOPAR, LLC, Wasilla, AK (US)

(72) Inventor: Paul A. Skvorc, II, Wasilla, AK (US)

(73) Assignee: Biopar, LLC, Wasilla, AK (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/634,594

(22) Filed: Jun. 27, 2017

(65) Prior Publication Data

US 2018/0070558 A1 Mar. 15, 2018

Related U.S. Application Data

(63) Continuation of application No. 15/077,788, filed on Mar. 22, 2016, now Pat. No. 9,693,535, which is a (Continued)

(51) Int. Cl.
*A01K 29/00* (2006.01)
*B07C 5/34* (2006.01)
(Continued)

(52) U.S. Cl.
CPC .......... *A01K 11/006* (2013.01); *A01K 11/008* (2013.01); *A01K 29/00* (2013.01);
(Continued)

(58) Field of Classification Search
CPC ........ A01K 29/00; A01K 29/005; B07C 5/34; B07C 5/3416; B07C 5/342; B07C 5/3422; B07C 5/344
(Continued)

(56) References Cited

U.S. PATENT DOCUMENTS 3,040,980 A 6/1962 Mann ................................ 377/6
3,096,600 A 7/1963 Gwyther ........................ 43/100
(Continued)

FOREIGN PATENT DOCUMENTS

DE 44 20 254 A1 1/1995
EP 1 018 297 A1 7/2000
(Continued)

OTHER PUBLICATIONS

Dong, C., et al., "Particle Retention Measurement Using Image Processing for a Spray Marking System", *Communications, Computers and Signal Processing*, IEEE Pacific Rim Conference, May 19-21, 1993, pp. 790-793, XP-010141679.
(Continued)

*Primary Examiner* — David J Parsley
(74) *Attorney, Agent, or Firm* — Sheppard Mullin Richter & Hampton LLP

(57) ABSTRACT

The system for uniquely identifying subjects from a target population operates to acquire, process and analyze images to create data which contains indicia sufficient to uniquely identify an individual in a population of interest. This system implements an automated, image-based process that captures data indicative of a selected set of external characteristics for subjects that are members of a target population of a predetermined species.

16 Claims, 5 Drawing Sheets

Related U.S. Application Data continuation of application No. 14/480,526, filed on Sep. 8, 2014, now Pat. No. 9,295,227, which is a continuation of application No. 13/850,139, filed on Mar. 25, 2013, now Pat. No. 8,826,863, which is a continuation of application No. 13/352,934, filed on Jan. 18, 2012, now Pat. No. 8,438,997, which is a continuation of application No. 12/716,083, filed on Mar. 2, 2010, now Pat. No. 8,113,151, which is a continuation of application No. 10/498,188, filed as application No. PCT/US03/35581 on Nov. 6, 2003, now Pat. No. 7,841,300.

(60) Provisional application No. 60/424,917, filed on Nov. 8, 2002.

(51) Int. Cl.
*A01K 11/00* (2006.01)
*G06K 9/00* (2006.01)
*A01K 61/90* (2017.01)
*G06K 9/62* (2006.01)
*G06T 7/00* (2017.01)

(52) U.S. Cl.
CPC .............. *A01K 61/90* (2017.01); *B07C 5/34* (2013.01); *G06K 9/00* (2013.01); *G06K 9/00362* (2013.01); *G06K 9/00885* (2013.01); *G06K 9/6215* (2013.01); *G06T 7/0002* (2013.01); *G06T 2207/10004* (2013.01)

(58) Field of Classification Search
USPC ............ 119/174, 416–417, 712, 751–752; 209/539, 576–577, 587–588, 598, 209/656–657, 934, 939
See application file for complete search history.

(56) References Cited

U.S. PATENT DOCUMENTS

| | | | |
|---|---|---|---|
| 3,564,132 A | 2/1971 | Baker et al. | 178/6.8 |
| 4,084,148 A | 4/1978 | Koshikawa | 340/1 R |
| 4,095,092 A | 6/1978 | Neff | 377/6 |
| 4,226,540 A | 10/1980 | Barten et al. | 356/445 |
| 4,351,438 A | 9/1982 | Morton | 209/675 |
| 4,392,236 A | 7/1983 | Sandstrom et al. | 378/45 |
| 4,626,992 A | 12/1986 | Greaves et al. | 600/300 |
| 4,743,742 A | 5/1988 | Espedalen | 235/1 R |
| 4,854,455 A | 8/1989 | Faivre | 209/678 |
| 4,934,537 A | 6/1990 | DeBourke | 209/588 |
| 5,063,603 A | 11/1991 | Burt | 382/37 |
| 5,222,458 A | 6/1993 | Pippy | 119/5 |
| 5,280,436 A | 1/1994 | Kubota et al. | 364/559 |
| 5,816,196 A | 10/1998 | Webster et al. | 119/228 |
| 5,823,140 A | 10/1998 | Pittet et al. | 119/174 |
| 5,930,804 A * | 7/1999 | Yu | G06F 21/32 |
| 5,991,429 A | 11/1999 | Coffin et al. | 382/118 |
| 6,006,126 A | 12/1999 | Cosman | 600/426 |
| 6,234,109 B1 | 5/2001 | Andersson et al. | 119/14.08 |
| 6,256,737 B1 * | 7/2001 | Bianco | G06F 21/32 |
| | | | 713/186 |
| 6,310,966 B1 * | 10/2001 | Dulude | G06Q 20/04 |
| | | | 382/115 |
| 6,318,289 B1 | 11/2001 | Pratt | 119/51.02 |
| 6,418,235 B1 | 7/2002 | Morimoto et al. | 382/118 |
| 6,546,368 B1 * | 4/2003 | Weninger | G10L 17/26 |
| | | | 704/270 |
| 6,687,386 B1 | 2/2004 | Ito et al. | 382/103 |
| 6,697,509 B2 | 2/2004 | De La Torre-Bueno | 382/133 |
| 6,700,669 B1 | 3/2004 | Geng | 356/603 |
| 6,880,485 B2 | 4/2005 | Massey | 119/220 |
| 6,922,145 B2 | 7/2005 | Piesinger | 340/541 |
| 6,974,373 B2 | 12/2005 | Kriesel | 452/157 |
| 7,190,814 B2 | 3/2007 | Miichi et al. | 382/118 |
| 7,841,300 B2 | 11/2010 | Skvorc, II | 119/712 |
| 8,113,151 B2 | 2/2012 | Skvorc, II | 119/712 |
| 8,438,997 B2 | 5/2013 | Skvorc, II | 119/72 |
| 8,826,863 B2 | 9/2014 | Skvorc, II | |
| 9,295,227 B2 | 3/2016 | Skvorc, II | |
| 9,693,535 B2 * | 7/2017 | Skvorc, II | A01K 11/008 |
| 2002/0079249 A1 | 6/2002 | Lawandy et al. | 209/3.3 |
| 2003/0043042 A1 * | 3/2003 | Moores, Jr. | G07C 9/27 |
| | | | 340/573.1 |
| 2005/0011470 A1 | 1/2005 | Skvorc, III | 119/712 |
| 2010/0215278 A1 | 8/2010 | Skvorc, III | 382/218 |
| 2012/0114186 A1 | 5/2012 | Skvorc, II | 382/110 |
| 2013/0216104 A1 | 8/2013 | Skvorc, II | 382/110 |
| 2014/0376783 A1 | 12/2014 | Skvorc, II | 382/110 |

FOREIGN PATENT DOCUMENTS

| | | |
|---|---|---|
| FR | 2634573 | 1/1990 |
| GB | 2201772 | 9/1988 |
| JP | 1-126546 | 5/1989 |
| JP | 1-195364 | 8/1989 |
| JP | 5-304851 | 11/1993 |

OTHER PUBLICATIONS

Pike Angler's Club of Great Britain, "Recognition of Individual Pike", Internet Address http://web.archive.org/web/20020707205535/ http://freespace.virgin.net/vicky.mark/aboutpike/recognition.html, Mar. 24, 2004, p. 2, XP-002274805.

English translation of Japanese Patent No. 5-304851, "Method for Sorting Males and Females of Ayu Fishes and its Device", Katsuhiko Kawaguchi, Nov. 1993.

English translation of Japanese Patent No. 1-126546, "Method for Identifying Rate of Movement of Multiple Fish", by Takashi Iida et al., May 1989.

Jacob et al., Translation of French Patent No. FR 2634573, Jan. 26, 1990.

English translation of French patent 2,634,573, "Fish Counting Device" by M. Jacob et al., Jan. 1990.

* cited by examiner

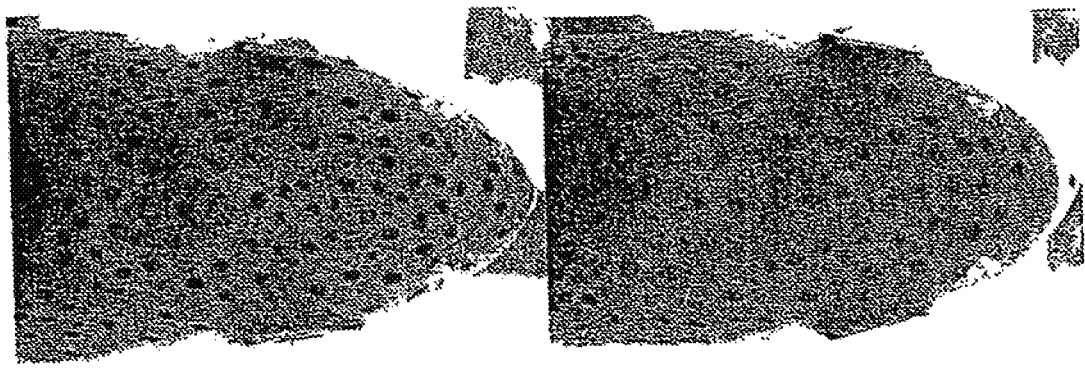
FIGURE 4　　　　　　　　　FIGURE 5
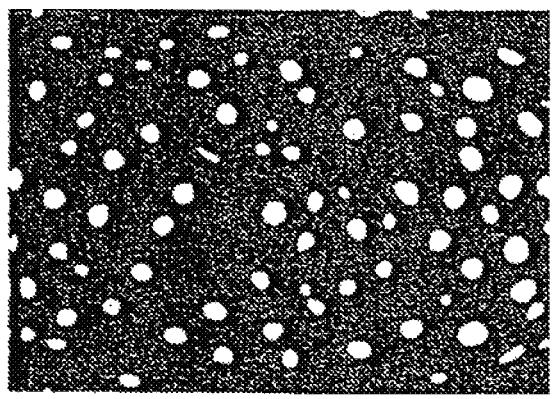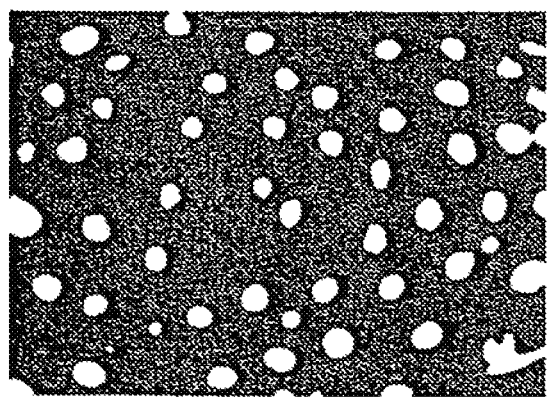
FIGURE 6　　　　　　　　　FIGURE 7

SYSTEM FOR UNIQUELY IDENTIFYING SUBJECTS FROM A TARGET POPULATION

RELATED APPLICATIONS

This application is a continuation of U.S. patent application Ser. No. 15/077,788, filed Mar. 22, 2016, entitled "SYSTEM FOR UNIQUELY IDENTIFYING SUBJECTS FROM A TARGET POPULATION," now U.S. Pat. No. 9,693,535, which is a continuation of U.S. patent application Ser. No. 14/480,526, filed Sep. 8, 2014, entitled "SYSTEM FOR UNIQUELY IDENTIFYING SUBJECTS FROM A TARGET POPULATION," now U.S. Pat. No. 9,295,227, which is a continuation of U.S. patent application Ser. No. 13/850,139, filed Mar. 25, 2013, entitled "SYSTEM FOR UNIQUELY IDENTIFYING SUBJECTS FROM A TARGET POPULATION," now U.S. Pat. No. 8,826,863, which is a continuation of U.S. patent application Ser. No. 13/352,934, filed Jan. 18, 2012, entitled "SYSTEM FOR UNIQUELY IDENTIFYING SUBJECTS FROM A TARGET POPULATION," now U.S. Pat. No. 8,438,997, which is a continuation of U.S. patent application Ser. No. 12/716,083, filed Mar. 2, 2010, entitled "SYSTEM FOR UNIQUELY IDENTIFYING SUBJECTS FROM A TARGET POPULATION," now U.S. Pat. No. 8,113,151, which is a continuation of U.S. patent application Ser. No. 10/498,188, filed Jun. 8, 2004, entitled "SYSTEM FOR UNIQUELY IDENTIFYING SUBJECTS FROM A TARGET POPULATION," now U.S. Pat. No. 7,841,300, which claims priority from PCT application PCT/US2003/035581, filed Nov. 6, 2003, which claims priority from U.S. Provisional Application Ser. No. 60/424,917, filed Nov. 8, 2002. All of these applications are hereby incorporated by reference into this disclosure in their entirety.

FIELD OF THE INVENTION

The invention relates to the field of natural resource management and more specifically to the automated identification of individual subjects in a target population to perform population and/or biological monitoring.

BACKGROUND OF THE INVENTION

It is a problem in the field of natural resource management to perform population and/or biological monitoring to uniquely identify an individual subject in a target population. In particular, while work has been done to differentiate among various species in a study area, in order to produce a gross count of the members of each species in the study area, there is a lack of any system that can automatically and accurately differentiate among the individual members of a particular species in a target population.

It is well known that the species in various taxa have external characteristics that are useful in uniquely identifying an individual member of the species. This process of identifying an individual member of the species is commonly done on a manual basis, more commonly in the management of mammals, where the herd managers can visually distinguish among members of a particular herd. This process is experientially based in that the herd manager over time remembers various characteristics that distinguish members of the managed herd. However, this knowledge is typically not recorded in any formal manner and is therefore not simply transferable to others. In addition, the knowledge base of a particular herd is not extensible to any other herd and the data collection and member recognition process must be laboriously reinitiated when a herd manager encounters a new herd or even additions to an existing herd. Finally, the identification process is not rigorous, in that it is subject to the personal determinations of the herd manager, may not be based on scientifically accurate distinctions, and may be limited to only gross identifying characteristics that are easily recognized.

In the case of very large populations of subjects, where the data collection and subject distinguishing processes are beyond a simple visual and human-based memory process, there is presently no method to enable the recognition of an individual member of the population. In these populations, the process in identifying the individual must be automatic, rapid and accurate and extensible to any size population or any population among a larger set of populations. In addition, any recognition process must be able to account for temporal and growth changes in the members of the population, such as seasonal variations and changes associated with aging. In addition, in order to distinguish among members of a very large population, a scientifically rigorous process must be used and is typically based on subtle and/or complex differentiable characteristics.

SUMMARY

One aspect of the invention relates to a system for uniquely identifying subjects from a target population which operates to acquire, process and analyze images of subjects to create data which contains indicia sufficient to uniquely identify an individual in a population of interest. The process used by the system in identifying the individual is automatic, rapid and accurate.

There are various species of interest in the field of natural resource management which have external characteristics that are useful in uniquely identifying an individual member of the species. These characteristics can be any recognizable feature or pattern of features, which in total have sufficient specificity to create a "signature" that is unique to the selected individual. These selected characteristics are typically members of the class of identifying characteristics that include: overall size, color, color/spot/stripe features, overall patterning, size and shape of physical features, features of horns/tusks/antlers, maturity-juvenile/adolescent/adult, scars, deformities, and the like.

The present system for uniquely identifying subjects from a target population implements an automated, image-based process that captures data indicative of a selected set of external characteristics for subjects that are members of a target population of a predetermined species. The captured data is then processed to create a database record which is associated with the selected subject and which can be used to uniquely identify the selected subject. The subject identification process is repeatable, so any subject can be accurately and repeatedly mapped to their associated database record, which database record can then be updated to reflect changes in the subject and/or presence of the subject in a target population.

The system for uniquely identifying subjects from a target population operates to acquire, process and analyze images to create data which contains indicia sufficient to uniquely identify an individual in a population of interest. This system implements an automated, image-based process that captures data indicative of a selected set of external characteristics for subjects that are members of a target population of a predetermined species.

BRIEF DESCRIPTION OF THE DRAWINGS

FIGS. 4 & 5 illustrate typical images that are captured for a selected subject for a species, such as rainbow trout.

FIGS. 6 & 7 illustrate typical patterns of characteristics that are identified for the selected subject illustrated in FIGS. 4 & 5.

DETAILED DESCRIPTION

Figure 1:
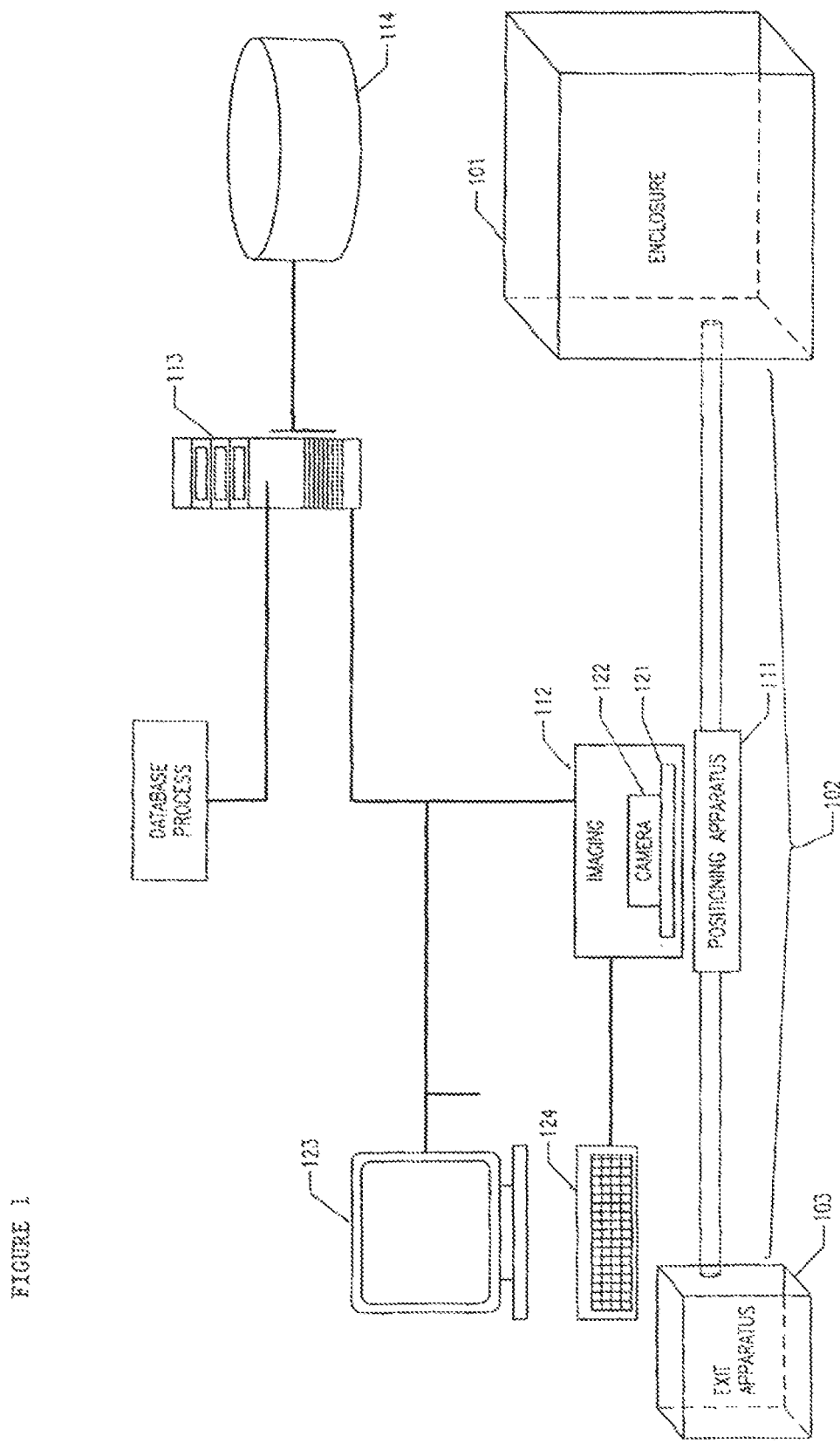
FIG. 1 illustrates, in block diagram form, the overall architecture of a typical embodiment of the present system for uniquely identifying subjects from a target population and an environment in which it is operable.

FIG. 1 illustrates, in block diagram form, the overall architecture of a typical embodiment of the present system for uniquely identifying subjects from a target population (termed "subject identification apparatus" herein) and an environment in which it is operable. The subjects are typically confined in a predetermined location, such as an enclosure 101, which enables the operator of the subject identification apparatus 100 to manage and select individual subjects for identification. The enclosure 101 can optionally be connected to a subject isolation apparatus 102 which enables the operator to separate one or more selected subjects from the target population confined in the enclosure 101. When the operator selects an individual subject, the subject is either automatically or manually oriented within the subject identification apparatus 100 for execution of the subject identification process. Once this process is completed, the selected subject is released into an exit apparatus 103 which serves to deliver the released selected subject to another site or location.

The subject identification apparatus 100 is comprised of a number of elements. In particular, a subject positioning apparatus 111 can be used to present the selected subject in a predetermined orientation and/or position to enable the imaging apparatus 112 to capture image data which enables the subject identification apparatus 100 to uniquely identify the selected subject. Alternatively, the present system can be used to process images that would be taken by field biologists of marginally-restrained (hand-held) or even free-ranging animals such as free-ranging giraffes or hand-held fish. Alternatively, a "lay" labor force of anglers can be used to take pictures of the fish they catch and release or "bird-watchers" can photographically verify the birds they view and add to their "life-lists". The captured image data is transmitted from the imaging apparatus 112 to a processor 113, which executes a database routine 115 that serves to create a database record for the selected subject and store the database record in a memory 114, where the database record includes the captured image data and/or processed image data that comprises a set of indicia that serves to uniquely identify the selected subject. The processor 113 can also store additional data in memory 114, such as: date, time, location, subject measurement data (e.g. weight, age, physical measurements, automatically received GPS data, etc), and the like as part of the database record for the selected subject. The processing of the captured image data can be in real time as the selected subject is positioned in the imaging apparatus 112 or off-line, after the selected subject is released from the imaging apparatus 112.

Furthermore, the imaging apparatus 112 can consist of a number of elements that are cooperatively operative to generate the captured image data. These elements are a function of the species of subject that is to be imaged as well as the selected set of characteristics that are to be monitored to create the signature that uniquely identifies the selected subject. Within these general considerations, it is expected that there are numerous implementations possible for the imaging apparatus 112 and the description of any such apparatus herein represents an illustration of such apparatus and should not be construed as any limitation of the inventive concepts described and claimed herein. Therefore, at an architectural level, it is expected that the imaging apparatus 112 would typically include a subject illumination apparatus 121 to provide the desired illumination and/or contrast, if it is determined that the ambient light is insufficient, to enable the subject identification apparatus 100 to accurately determine the presence of and perform measurements of the selected characteristics for this species of subjects. In addition, an image capture device 122, such as a digital camera or other such image rendering apparatus, is used to determine the presence of and perform measurements of the selected characteristics for this species of subjects. Optionally, a display device 123 is provided to enable the operator to view and monitor the operation of the image capture device and controls 124 can be provided to further enable the operator to regulate the operation of the image capture device 122 and/or the positioning of the subject within the subject positioning apparatus 111.

System Operation—Image Capture

Figure 2:
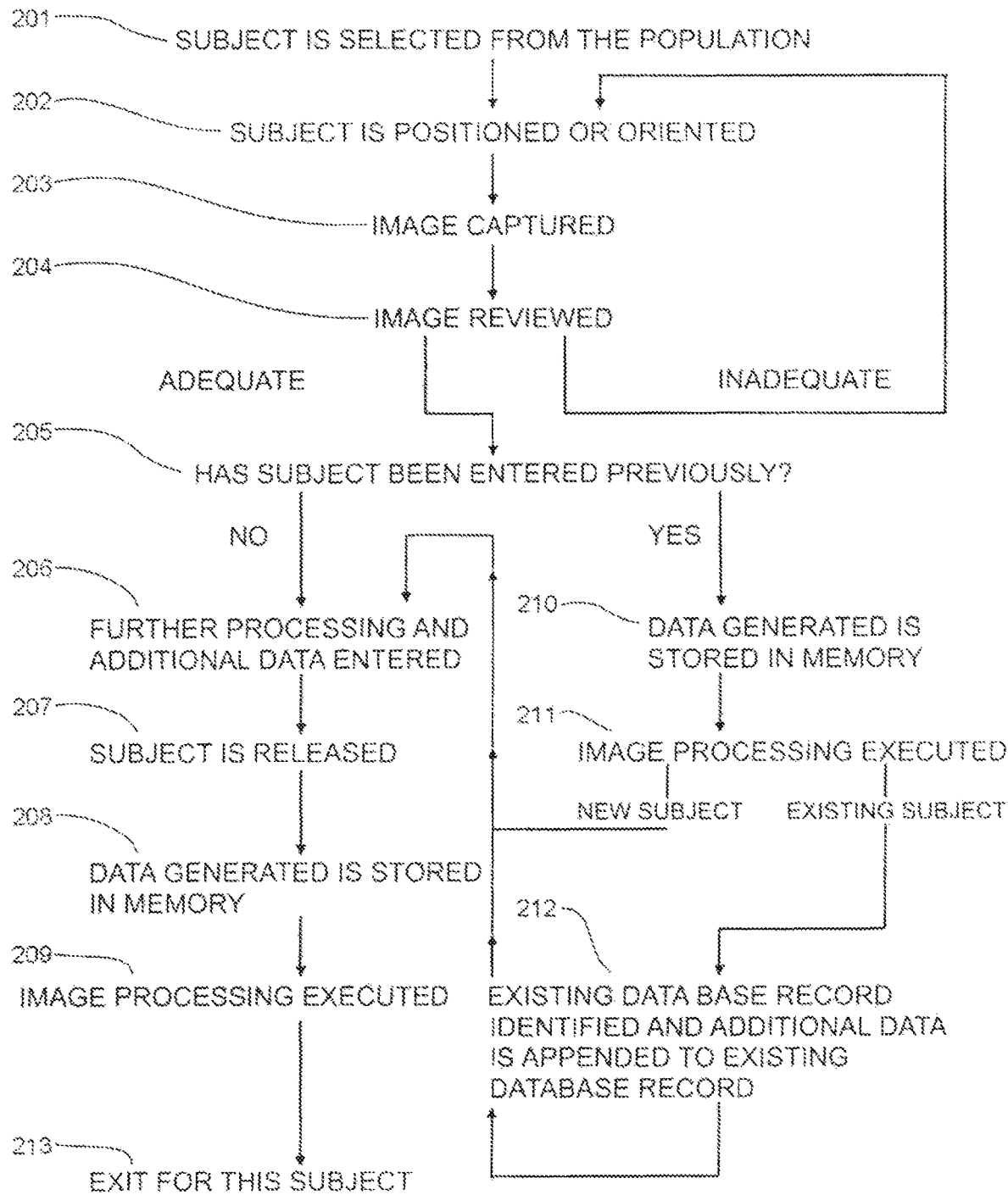
FIG. 2 illustrates, in flow diagram form, the operation of a typical embodiment of the present system for uniquely identifying subjects from a target population to capture an image of a selected subject.

FIG. 2 illustrates, in flow diagram form, the operation of a typical embodiment of the present system for uniquely identifying subjects from a target population 100 to capture an image of a selected subject. There are numerous alternative implementations of this process and the following description is simply to illustrate a typical application of the present system for uniquely identifying subjects from a target population. Depending upon the nature of the subject and the purpose of the image generation process, the subject may simply be imaged or it may be imaged and identified (such as by tagging), or it may be imaged and compared with the data stored in a database to determine whether it has previously been imaged. The imaging process can be incorporated into a population management process, where the subject is uniquely identified, then additional measurements taken on the subject to populate an entry in the population database to track various criteria related to the subject, such as size, weight, and the like. These "additional measurements" are automatically extracted from the image using image processing and pattern recognition techniques. The photographer may provide physical data, but for most of the morphometrics of the animal; the present system for uniquely identifying subjects from a target population automatically extracts the additional measurements. Also, gender in many cases is automatically recognized.

The typical imaging process is initiated at step 201, where a subject is selected from the population and, at step 202, the subject is positioned or oriented to enable a clear view of the subject. At least one image of the subject is captured by image capture device 122 at step 203, of which at least one image is typically in the form of a digital image. The image can optionally be reviewed by an operator on display device 123 at step 204 to ensure that there is sufficient quality of the image and number of features of the desired characteristic contained in the image to enable the subject identification process to accurately render an identification of the subject. If the quality and/or content of the captured image are inadequate, processing returns to step 202 (or 203) and the image capture process is reactivated. If the image quality and content are adequate, a determination is made at step 205 whether the subject is simply to be added to the database as a newly acquired image or whether it must be determined whether the subject has previously been entered into the database. If this is a newly acquired image, the subject is then further processed at step 206, additional data, if any, associated with the further processing entered into the database in a database record associated with this subject and the subject is then released at step 207. The data generated from the image generation process is stored in memory 114 at step 208 for processing at step 209 either contemporaneously with the image capture process or off line as a background process. In fact, if the image processing is contemporaneously done with image capture, the image processing step can optionally signal the operator when a successful image processing has been effected and the subject can be released.

If it is determined at step 205 that this subject imaging process may include subjects already recorded in the database, then it must be determined whether this subject has previously been entered into the database, and processing advances to step 210 where the data generated from the image generation process is stored in memory at step 211 for processing at step 212, as described below. The image processing at step 213 either returns an indication that the subject is a newly acquired subject, at which point processing advances to step 206 as described above, or an indication that the subject matches an existing database record for this subject, at which point the existing database record associated with this subject is identified and all additional data generated in this process is appended to the existing database record. Processing now advances to step 206 as described above.

Example of Selected External Characteristics of a Selected Species (24) As noted above, it is well known that the species in various taxa have external characteristics that are useful in uniquely identifying an individual member of the species. These characteristics can be any recognizable feature or pattern of features, which in total have sufficient specificity to create a "signature" that is unique to the selected individual. These selected characteristics are typically members of the class of identifying characteristics that include: overall size, color, color/spot/stripe, overall patterning, size and shape of physical features, particularities of horns/tusks/antlers, maturity-juvenile/adole-scent/adult, scars, deformities, and the like. The features within a characteristic are the specific unique implementations of the characteristic.

As an example, the rainbow trout (*Oncorhynchus Mykiss*) has the characteristic color/spot/stripe which has as its set of features the details of the colors/spots/stripes, for example, the location and/or size and/or color of the spots. In the characteristic of overall patterning, the features are not individual datum points, such as location of a spot, but instead are the pattern details. For example, the brook trout (*Salvelinus fontinalis*) has as one of its visual characteristics vermiculations on its back. The pattern of vermiculations does not have 'spots' per se, and unless considered at the discrete pixel level, it does not have 'multiple datum points.' In this case, the totality of the differences in intensity is the 'pattern' that distinguishes subjects. The plurality of features in this instance is therefore the plurality of differences in intensity.

Thus, an external characteristic, that contains a sufficient number of features to provide a unique signature for the subject, can be used to identify the subject. The definition of "characteristic" and "features" are a function of the species and these terms are used herein to provide a consistent structure in describing the operation of the present system for uniquely identifying subjects from a target population.

In order to illustrate the operation of the present system for uniquely identifying subjects from a target population, a species of fish—rainbow trout (*Oncorhynchus Mykiss*)—is used as an example. In this case, one characteristic of interest is the spot pattern on the fish, and the features of this characteristic are the plurality of spots that are imaged. Subjects can be located or confined in a monitoring area or manually positioned on an image platen to thereby capture an image of the subject or pertinent section of the subject that contains the desired characteristics. For example, fish can be captured using fyke traps, electro fishing, seines, trawls, angling and the like.

FIGS. 4 & 5 illustrate typical images that are captured for a selected subject for a species, such as rainbow trout and FIGS. 6 & 7 illustrate typical patterns of characteristics that are identified for the selected subject illustrated in FIGS. 4 & 5 as part of the imaging process. In the case of a fish, the components of the image in order of priority are typically:

1.) Fish as separated from background
(function of background/background color/lighting)
2.) Components of the head:
a. nares (nasal passages)
b. head length—anterior and posterior margins
c. spot pattern Given this ordered priority of components, a determination must be made regarding the characteristics captured by the image that are required to enable the subject identification apparatus 100 to define a signature that uniquely identifies the subject. This determination includes the use of color in the image as an alternative to gray scale intensity. With color, the image data can be filtered to thereby enhance the distinction between datum points of the features of the selected characteristic(s) and non-essential image data. Other components of the features can include: size, location of the spot on the image, roundness—shape of the spot, other features. All of these features must be oriented in a three dimensional space using the imaging features: roll, pitch, yaw. Therefore, in addition to determining image characteristics, the subject must be oriented using either automatic positioning or manual positioning—which typically entails projecting a superimposed grid on the subject to facilitate manual positioning of the subject with relation to the image capture apparatus.

System Implementations for a Selected Species

Figure 9:
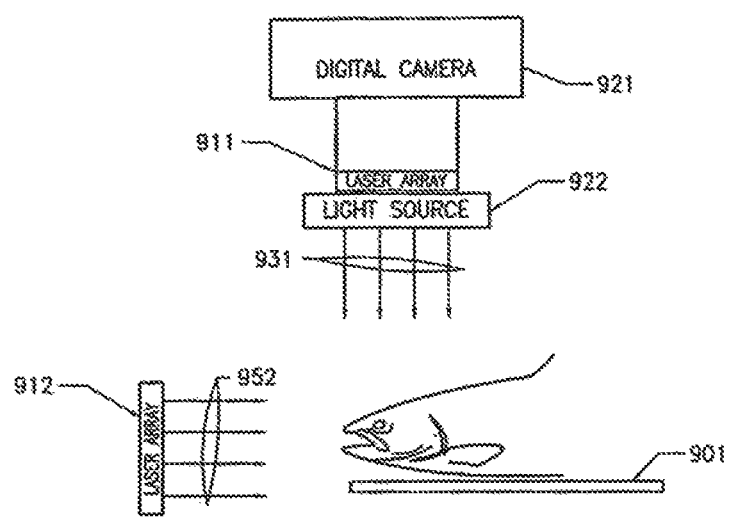
FIGS. 8 and 9 illustrate two alternative embodiments of the subject positioning apparatus and image capture apparatus for a selected species.
Figure 8:
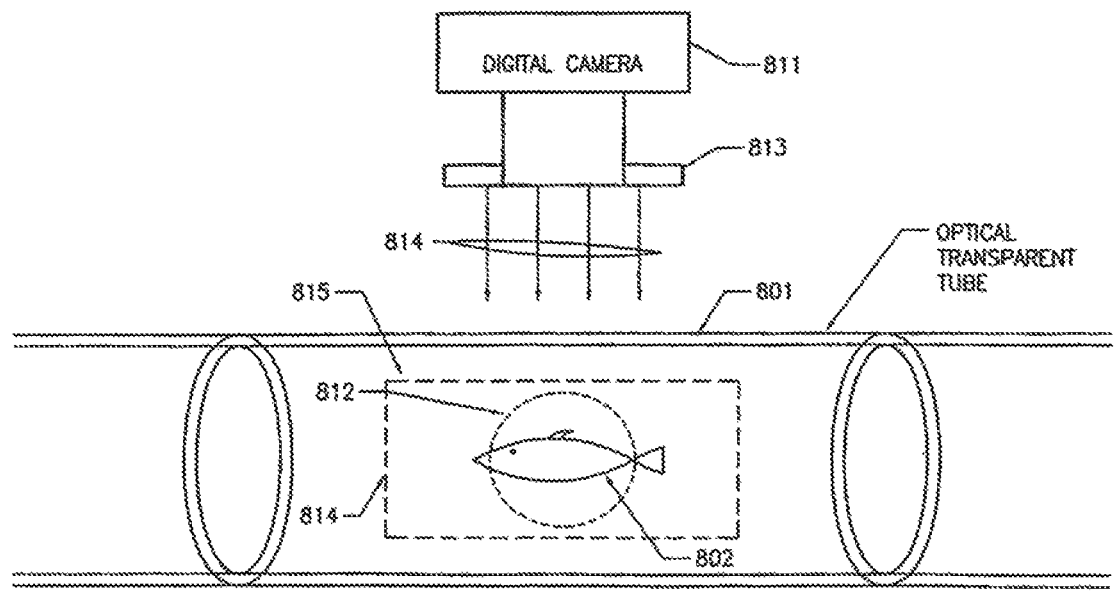

FIGS. 8 and 9 illustrate two alternative embodiments of the subject positioning apparatus and image capture apparatus for the above-noted selected species.

In FIG. 8, an optically transparent tube 801 is used as the subject positioning apparatus 111 and creates a constrained path through which the selected subject 802 (fish) is transported. The optically transparent tube 801 is positioned juxtaposed to at least one digital camera that comprises a part of the imaging apparatus 112. Preferably, two digital cameras 811, 812 are used, positioned orthogonal to each other, to obtain top and side views of the subject 802 once it is positioned in front of the digital camera(s). In addition, two 9 laser arrays 813, 815 can be used to project positioning grids 814, 816 into the image frame. One array 815 from the side projects a grid on to the side of the fish's head and provides roll and yaw information. The second array 813 projects a grid from the top and provides pitch information. The superimposed grids also provide quantitative data regarding the curvature of the fish, which enables the captured image to be projected on a flat reference plane. A lighting source (not shown) can be included to illuminate the subject when it is positioned in front of the digital cameras. This apparatus is particularly useful in capturing image data for juvenile fish, where manual handling would potentially cause injury to the fish.

In FIG. 9, an adult fish model of the subject positioning apparatus 111 is illustrated. This apparatus comprises a platen 901 and three laser grid projection arrays 911, 912, 913 positioned orthogonal to one another. The platen 901 is positioned juxtaposed to at least one digital camera 921 that comprises a part of the imaging apparatus 112. A lighting source 922 (shown as a ring flash) can be included to illuminate the subject 902 when the subject is positioned in front of the digital camera. The light source may not be necessary and if used, can be any of the numerous types of illumination apparatus, including an electronic flash, incandescent bulbs, light box, etc. These laser grid projection arrays 911-913 superimpose a grid 931-933 of precisely positioned "dots" on the fish's (animal's) head (body). By examining the distortion of the projected grid, the exact position and shape of the fish's (animal's) head (body) can be determined from the images. This allows the system to "unwrap" the curved head/body, as well as correct for 3-space positioning (roll, pitch and yaw) of the fish/animal. While not necessary for matching/identification, this added information greatly facilitates machine-autonomous operations. Furthermore, it greatly speeds up the feature extraction (quantifying the pattern) and pattern recognition (finding/matching the earlier image in the database).

System Operation—Image Processing

The database is populated with a plurality of data records, each of which comprises the image data and/or the processed image data. The matching technique is often referred to as "template matching" which uses autocorrelation as a method for extracting weak signals from a noisy channel. Many image processing techniques are devoted to the same principle—extracting the "signal" from "noisy" image. The autocorrelation process used in signal processing is exactly (mathematically) the same process applied to images. In the case of images, it is applied to each line of the image both horizontally and vertically. For example, in a 1K×1K image, the resulting autocorrelation is a (2K−1)×(2K−1) matrix/image, made up of the single-dimensional (signal processing-type) of each horizontal and vertical row/column of pixels.

Figure 3:
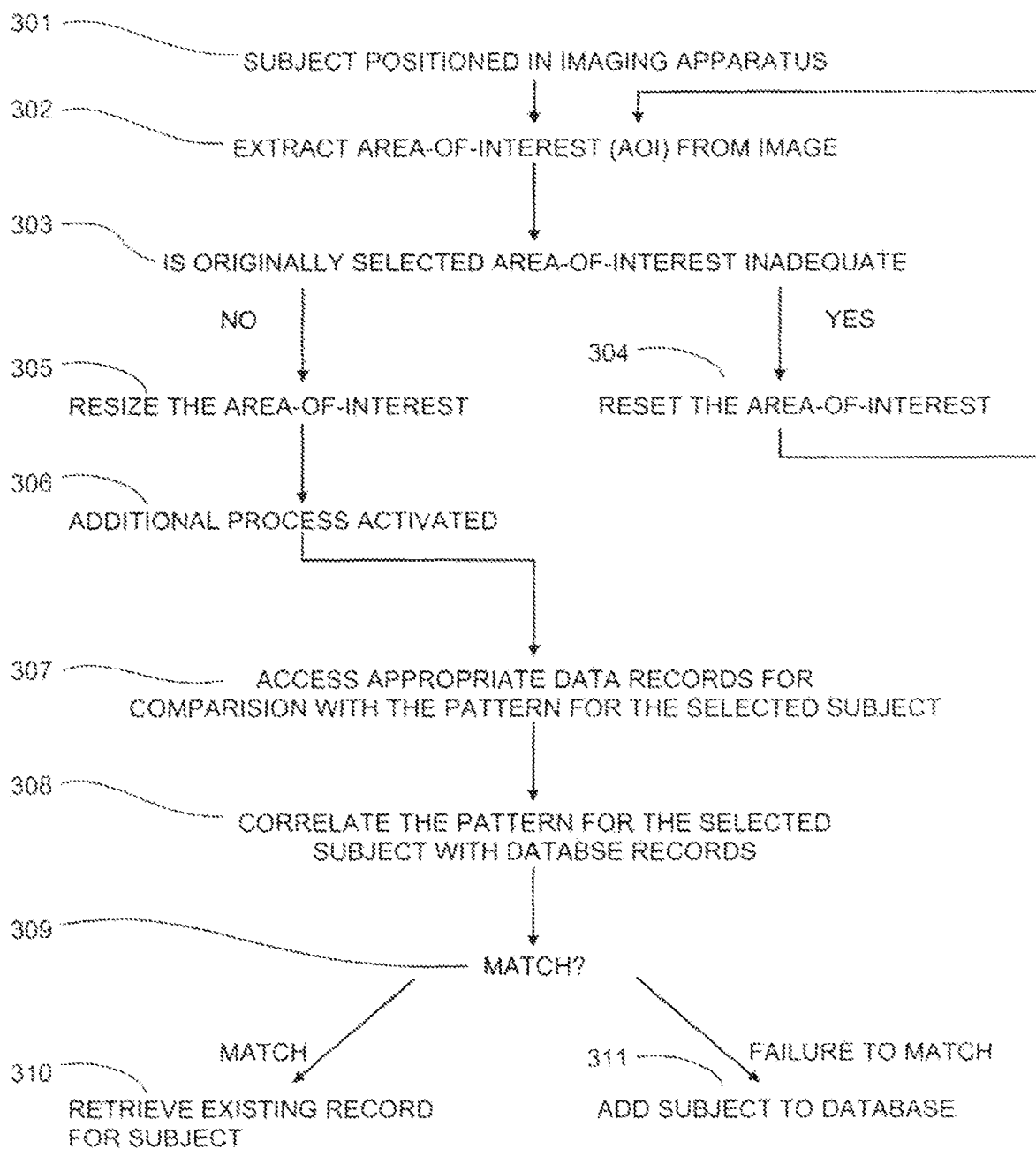
FIG. 3 illustrates, in flow diagram form, the operation of a typical embodiment of the present system for uniquely identifying subjects from a target population to process the captured image and uniquely identify the selected subject.

) FIG. 3 illustrates, in flow diagram form, the operation of a typical embodiment of the present system for uniquely identifying subjects from a target population to process the captured image and uniquely identify the selected subject. At step 301, the operator (or the system in the automatic mode of operation) positions the subject in the imaging apparatus 112 and at step 302 extracts an Area-Of-interest (AOI), such as a geometric shaped site, typically a rectangle, from the image of the new/unknown subject. This Area-Of-Interest is specific to the species or race of subject, and is determined in the preliminary evaluation/examination of the species. In the specific case of Rainbow trout, this Area-Of-Interest is typically delimited by the nares and the posterior terminus of the head. The operator (this term is used herein but is intended to be inclusive of an automated system operation) determines at step 303 whether the originally selected Area-Of-Interest is inadequate for the pattern recognition purposes. If not, processing advances to step 305. If so, at step 304, the operator resets the Area-Of-Interest and selects an "appropriate" Area-Of-Interest with the "best" (most mathematically discernable) pattern and processing returns to step 302. Since almost any region on the fish/animal can be used to define/determine the characteristic of a spot pattern that can be automatically identified, the selection of Area-Of-Interest is more one of administrative selection for consistency purposes.

At step 305, the operator can resize the Area-Of-Interest to a lower resolution to facilitate increased speed of processing the captured image data. The typical autocorrelation process requires $2n^2$ floating point operations and therefore a reduction in the number of features (spots) comprising the selected characteristic (spot pattern) that must be identified significantly improves the processing efficiency. In the specific case of the Rainbow trout, there is a lower limit to the uniqueness of the spot pattern and discriminating thresholds become difficult to determine with fewer than three spots if only a correlation process is used. However, combining correlation with additional image data processing features can improve the signature determination and processing speed. Therefore, at step 306, an additional process can be activated, such as determining specific optical centers of each spot (exact x, y location of the optical center of the spot in the Area-Of-Interest), which elevates the discriminatory ability of the system as a whole. Augmenting the correlation process with additional image data processing routines represents species-specific "tweaking". Thus, components of the features of the selected characteristic(s) can be used as well as more than one characteristic to obtain the unique signature for the subject.

At step 307, the processor 113 of the subject identification apparatus 100 accesses the database of Area-Of-Interest data for this species, using database process 115 and selects appropriate data records from the database of data records for comparison with the presently determined pattern for the selected subject. At step 308, the processor performs the correlation operation 116 to determine the correspondence between each selected database record representing a known pattern and the presently determined characteristic for the selected subject. When comparing two subjects' characteristics using this method, the Area-Of-Interest for the known characteristics and the presently determined characteristic do not have to be exact, only "close", since the correlation technique allows a certain amount of "flexibility" in selecting the exact Area-Of-Interest and still provides excellent matching ability. At step 309, the processor 113 determines whether the resulting correlation coefficient is below the species-specific pre-selected values (threshold), resulting in a 'match' with an existing known pattern for a previously determined subject as indicated at step 310, or a failure to match, resulting in the present subject being added to the database at step 311.

The characteristic(s) being used for identification purposes need only be discernable from the background. The above outlined process, using a spot pattern on the fish as the characteristic, requires that a 'mask' be made that allows "extraction" of the individual features (spots) and the characteristic (spot pattern) from the background. This process is generally referred to as "feature extraction". Identifying "real" spots is no small matter, and a number of techniques can be used to enhance this process. In particular, using the electromagnetic frequency domain (color) to assist the feature extraction process is a possibility in some species where the frequency response (the "transfer function" in the electromagnetic domain) of the photographic sensor is selected or a spectral filter is used to isolate "real" features and reject the background or anomalies that could be mistaken for features.

Instead of pixelization of the pattern from the image data, a Euclidian distance computation can be done in a polar coordinate system which uses a point of reference and computes the angle from a reference line and the Euclidian distance from the point of reference to the optical center of each selected spot. However, such an alternative system is less amenable to automation and simplified processing of the image data when the subject has a large number of spots. However, this method may have merit in dealing with other species of subjects where the characteristics have traits that require Euclidian distance computations, such as determination of the antlers on ungulate species. Furthermore, there are numerous pattern matching techniques that can be used and these are well published and within the knowledge of one of ordinary skill in the art. Therefore, an extensive discourse regarding these techniques is unnecessary for the purposes of describing the present subject identification apparatus 100 and is omitted in the interest of simplicity of description.

What is claimed is:

1. A system configured to dynamically update records corresponding to individual subjects from a group of subjects, the system comprising:
   electronic memory for storing records corresponding to the individual subjects from the group of subjects, wherein individual stored records include at least one feature of one or more characteristics of the corresponding subject; and
   one or more processors programmed with computer-executable instructions that, when executed by the one or more processors, program the one or more processors to:
      obtain a digital image of a current subject produced by an image capture device, wherein the digital image captures a current feature of the one or more characteristics of the current subject;
      compare the current feature of the current subject and one or more of the stored records;
      determine whether the current subject corresponds to at least one of the stored records based on the comparison of the current feature of the current subject and one or more of the stored records;
      responsive to a determination that a first record of the stored records corresponds to the current subject, compare the digital image and the first record;
      determine that at least one of the one or more characteristics of the first subject have changed based on the comparison of the digital image and the first record; and
      update the first record based on the determination that at least one of the one or more characteristics of the first subject have changed.

2. The system of claim 1, the system further comprising:
   a subject isolation apparatus configured to physically isolate the current subject from a group of subjects.

3. The system of claim 1, the system further comprising:
   the image capture device configured to capture the digital image of the current feature of the one or more characteristics of the current subject.

4. The system of claim 3, wherein the one or more processors are communicatively linked with the image capture device, and wherein the one or more processors are configured to obtain the digital image from the image capture device.

5. The system of claim 3, the system further comprising:
   a subject positioning apparatus configured to position the current subject in a predefined position, wherein the image capture device is configured to capture digital images of the predefined position.

6. The system of claim 2, the system further comprising an exit apparatus, wherein the one or more processors are further programmed to:
   cause the current subject to be deposited into the exit apparatus, wherein the current subject is able to exit the subject isolation apparatus through the exit apparatus.

7. The system of claim 1, wherein the one or more processors are further programmed to:
   identify one or more aspects of the current subject based on the comparison of the current feature of the current subject and the stored records, wherein the one or more aspects comprise a gender of the current subject, a species of the current subject, and/or an identification of the current subject.

8. The system of claim 1, wherein the one or more characteristics include one or more of overall size; color; color, spot, and/or stripe features; overall patterning;
   size and/or shape of physical features; features of horns, tusks, and/or antlers; indications of maturity and/or age; scars; or deformities.

9. The system of claim 1, wherein to compare the current feature of the current subject and one or more of the stored records, the one or more processors are further programmed to:
   compare, for individual records of the stored records, the current feature of the current subject and the at least one feature stored in that record.

10. The system of claim 1, wherein to determine that a first record of the stored records corresponds to the current subject, the one or more processors are programmed to:
    determine that the current feature captured in the digital image matches a first feature of the first record.

11. The system of claim 10, wherein to update the first record based on the determination that at least one of the one or more characteristics of the first subject have changed, the one or more processors are further programmed to:
    process the digital image to obtain one or more measurements, separate from the current feature, of the current subject; and
    update the first record based on the one or more measurements.

12. The system of claim 11, wherein the measurements include a size of the current subject and/or a weight of the current subject.

13. The system of claim 10, wherein to update the first record based on the determination that at least one of the one or more characteristics of the first subject have changed, the one or more processors are further programmed to:
    obtain additional data associated with the current subject; and
    update the first record based on the additional data.

14. The system of claim 13, wherein the additional data includes a date associated with the digital image, a time associated with the digital image, and/or a location associated with the digital image.

15. The system of claim 1, wherein the one or more processors are further programmed to:
    determine whether the current subject is a member of one or more predefined species, wherein the current feature of the current subject is compared to one or more of the stored records responsive to a determination that the current subject is a member of the one or more predefined species.

16. The system of claim 1, wherein responsive to a determination that the current subject does not correspond to at least one of the stored records, the one or more processors are further programmed to:
   generate a record that corresponds to the current subject based on the digital image; and
   store the generated record in the electronic memory such that the stored records include a record that corresponds to the current subject.

\* \* \* \* \*